Dec. 10, 1929. H. HONIGMANN 1,739,150
VARIABLE SPEED DRIVE
Filed July 30, 1926   2 Sheets-Sheet 2

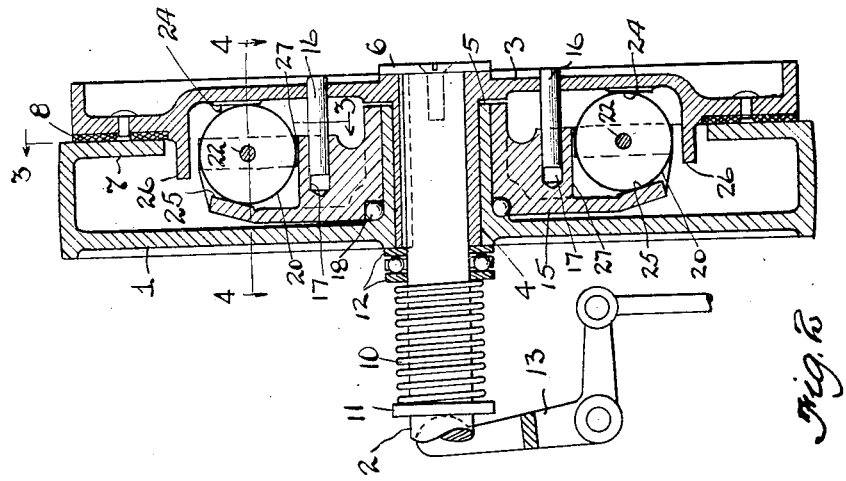
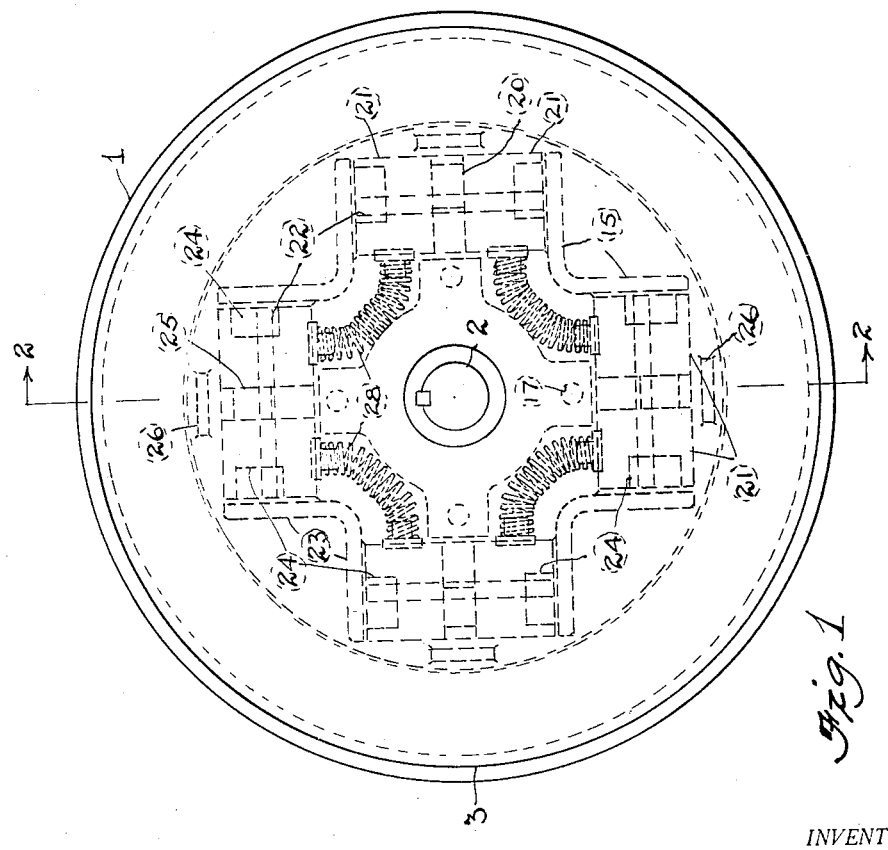

INVENTOR.
Hans Honigmann
BY
Fay, Oberlin & Fay
ATTORNEYS.

Patented Dec. 10, 1929

1,739,150

UNITED STATES PATENT OFFICE

HANS HONIGMANN, OF EAST CLEVELAND, OHIO, ASSIGNOR TO THE CHANDLER AND PRICE COMPANY, OF CLEVELAND, OHIO, A CORPORATION OF OHIO

VARIABLE-SPEED DRIVE

Application filed July 30, 1926. Serial No. 125,922.

The present improvements, relating as indicated to a variable speed drive, have more particular regard to a friction type of driving mechanism wherein a driving member, rotating at a constant rate of speed, may be caused to turn a driven member at the same or a selected slower speed as desired, within limits. The object of the invention is to provide a simple and compact mechanism of the type in question and one that will have a minimum number of operating parts so that there is little likelihood of the mechanism getting out of order. A further object is to permit variation in speed to be readily effected without interrupting the operation. At the same time the adjustment is sufficiently sensitive so that the speed of the driven member may be regulated to a nicety.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings:—

Figure 3:
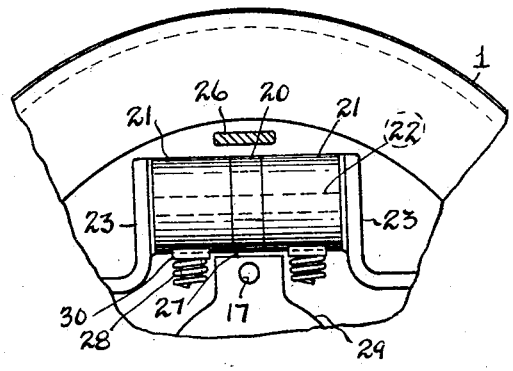
Figure 4:
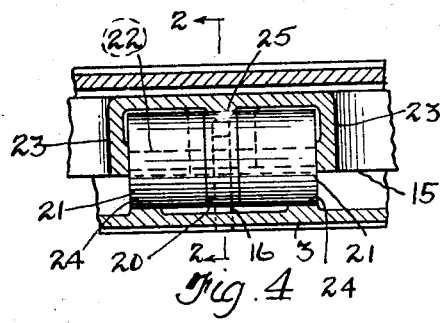

Fig. 1 is an end elevation of a variable speed clutch embodying the present improvements; Fig. 2 is a central axial section of such clutch, as indicated by the line 2—2, Figs. 1 and 4; and Figs. 3 and 4 are sectional details taken on the planes indicated by the lines 3—3 and 4—4, respectively, Fig. 2.

The driving member 1, in the illustrative construction of mechanism shown in the drawings, is in the form of a belt pulley, power being transmitted thereto by means of a belt (not shown), from any convenient source. It will be understood of course that a gear driven member may be equally well substituted for such belt pulley. The driven member of the mechanism is shown as a shaft 2, upon which said belt pulley 1 is rotatably mounted, except as it is frictionally clutched thereto through the mechanism now to be described. Such driving member is also free to move slightly in a direction longitudinally of said shaft. The driven member may of course take the form of any rotatable element that bears a corresponding relation to the driving member.

Keyed onto the end of shaft 2 is a disk 3, upon the hub 4 of which the hub 5 of the belt pulley 1 is rotatably mounted; in other words, the latter is not directly mounted on the shaft. A plate 6, attached to the end of the shaft, serves to retain the disk 3 against endwise movement, but, as indicated above, the hub of the belt pulley is shiftable longitudinally on the hub of the disk.

The diameter of the disk is substantially the same as that of the pulley and the latter is formed with an inwardly directed flange 7, against which the adjacent face of the disk, or rather an annulus 8 of friction material attached to such face, is adapted to bear. The pulley is normally pressed toward the disk so as to maintain frictional contact therewith by means of a compression spring 10 that surrounds the shaft 2 and lies between a shiftable collar 11 thereon and a thrust bearing 12 that is introduced between the corresponding end of the spring and the hub 5 of the belt pulley 1. The amount of pressure thus exerted by the spring may be varied in any suitable way, as for example by an oscillatory fork 13 that contacts with the outer face of the collar 11 and is arranged for operation from a point removed from the drive mechanism.

Rotatably mounted in turn on the hub 5 of pulley 1 is a third member 15 that is non-rotatively secured to the disk 3 by means of a series of pins 16 that project from the latter in a direction parallel to the shaft 2 into apertures 17 in said member 15. A series of balls 18, interposed between member 15 and the pulley 1 adjacent the hub of the latter, constitutes a thrust bearing and otherwise prevents lateral contact between said member and pulley.

As a result of the foregoing construction it will be seen that member 15 is rotatably carried around with the disk 3 and thus with shaft 2, but said member is free to partake of the longitudinal shifting movement of the pulley 1, irrespective of whether the flange 7 of the latter be in frictional engagement with the disk or not. Such frictional engagement is automatically controlled, within the limit set by the degree of compression to which spring 10 is subjected, by means of a plurality of sets rollers that are loosely carried by member 15 so as to be capable of radial movement therein, as well as movement longitudinally of the axis of said member, or, in other words, the axis of shaft 2. Each such set of rollers, as best shown in Figs. 3 and 4, comprises a central relatively narrow roller 20 located between two somewhat wider rollers 21 of the same diameter, the three rollers being mounted on a pin 22 so as to move in effect as a single roller. In fact the only purpose in thus employing a plurality of rollers instead of one is to introduce a certain amount of flexibility and reduce the tendency, which otherwise might be present, for such single roller to bind. Each set of rollers is endwise confined between rib-like projections 23 on the member 15, whereby movement of the set of rollers is limited to the radial and transverse directions hereinbefore referred to. In addition the disk 3 is formed with a pair of straight bearing faces 24 disposed to engage the rollers 21 of each set, while the member 15 is formed with an opposite located inclined or cam face 25, one for each set of rollers, that contacts with the central roller 20 of such set. The disk 3 is also formed with an inwardly projecting finger 26 adjacent each set of rollers, such finger preventing the rollers from being displaced too far outwardly, a corresponding shoulder 27 on the member 15 preventing such displacement inwardly.

Compression springs 28, confined in pockets 29 in the member 15, bear at their opposite ends against corresponding rollers 21 of adjacent sets through the medium of shoes 30 and serve to locate such sets of rollers properly within the spaces therefor provided, and also to insure that the inner roller 20 of each set is in contact with the inclined cam face 25 on the member. It will be understood, however, that these springs 28 are not of sufficient strength to have any operative effect on the rollers, such effect being obtained wholly by the tendency due to centrifugal action when the mechanism is in rapid rotation to force the rollers radially outwardly. Under the condition thus stated, as will be readily seen upon reference to Fig. 2, the several sets of rollers will tend to force apart the disk 3 and the member 15 that carries the rollers, the distance by which the disk and member are separated being determined by which the disk and member are separated being determined by the distance the rollers travel outwardly along the inclined cam face 25 on the member. A very slight amount of travel will sufficiently relieve the pressure of the flange 7 of the pulley 1 against the friction element 8 on disk 3 to cause slippage between such disk and pulley, while if carried to the limit the effect of the rollers will be entirely to disengage such disk from the pulley.

The degree of compression of spring 10, it will be seen, serves to control the action of the rollers in thus separating the driving from the driven member, and such spring 10 may be adjusted by almost imperceptible degrees. As a result the construction of my improved variable speed drive, it will be seen, permits a gradual and extremely sensitive change in speed to be secured from a driving member without any interruption of the drive or any shock. Such driving mechanism is accordingly specially suited for use for driving printing presses and other types of machinery where a variation in speed is desirable, but where ordinary types of variable speed drives are objectionable for reasons that will be evident.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the character described, the combination of a shaft constituting the driven member, a driving member rotatably mounted on and also shiftable longitudinally of said shaft, a disk keyed onto said shaft and adapted to have frictional engagement with said driving member when the latter is moved towards said disk, means tending thus to move said member, rollers interposed between said member and disk and movable in a radial direction by centrifugal force, a carrier member for said rollers, and a cam face on said carrier member wherewith said rollers contact and thus serve to move said driving member away from said disk.

2. In mechanism of the character described, the combination of a shaft constituting the driven member, a driving member rotatably mounted on and also shiftable longitudinally of said shaft, a disk keyed onto said shaft and adapted to have frictional engagement with said driving member when the latter is moved towards said disk, means tending thus to move said member, plural sets, each comprising a plurality of rollers, interposed between said member and disk and movable in a radial direction by centrifugal force, a carrier member for said rollers, a cam face on said carrier member wherewith certain rollers of each set contact, and plane faces on said disk wherewith other of said rollers contact, so that outward movement of said rollers serves to move said driving member away from said disk.

3. In mechanism of the character described, the combination of a shaft constituting the driven member, a driving member rotatably mounted on and also shiftable longitudinally of said shaft, a disk keyed onto said shaft and adapted to have frictional engagement with said driving member when the latter is moved towards said disk, means tending thus to move said member, plural sets, each comprising three rollers mounted on a common spindle, interposed between said member and disk and movable in a radial direction by centrifugal force, a carrier member for said rollers, a cam face on said carrier member wherewith the central roller of each set contacts, and plane faces on said disk wherewith the two outer rollers of each set contact, so that outward movement of said rollers serves to move said driving member away from said disk.

4. In mechanism of the character described, the combination of a shaft constituting the driven member, a driving member rotatably mounted on and also shiftable longitudinally of said shaft, a disk keyed onto said shaft and adapted to have frictional engagement with said driving member when the latter is moved towards said disk, means tending thus to move said member, plural sets, each comprising three rollers mounted on a common spindle, interposed between said member and disk and movable in a radial direction by centrifugal force, a carrier member for said rollers, resilient means adapted to hold said rollers in place in said carrier member, a cam face on said carrier member wherewith the central roller of each set contacts, and plane faces on said disk wherewith the two outer rollers of each set contact, so that outward movement of said rollers serves to move said driving member away from said disk.

5. In mechanism of the character described, the combination of a shaft constituting the driven member, a driving member rotatably mounted on and also longitudinally shiftable of said shaft, a disk keyed onto said shaft and adapted to have frictional engagement with said driving member when the latter is moved towards said disk, means tending thus to move said member, rollers interposed between said member and disk and movable in a radial direction by centrifugal force, and a carrier member for said rollers, said carrier member comprising a hub sleeved on the hub of said driving member, and having a plurality of sockets spaced about its periphery, said rollers being received in said sockets.

6. In mechanism of the character described, the combination of a shaft constituting the driven member, a driving member rotatably mounted on and also longitudinally shiftable of said shaft, a disk keyed onto said shaft and adapted to have frictional engagement with said driving member when the latter is moved towards said disk, means tending thus to move said member, rollers interposed between said member and disk and movable in a radial direction by centrifugal force, and a carrier member for said rollers, said carrier member comprising a hub sleeved on the hub of said driving member, and having a plurality of sockets spaced about its periphery, said rollers being received in said sockets, a cam face on one wall of each of said sockets wherewith the the central roller of its respective set contacts, and plane faces on said disk adjacent each of said sockets wherewith the two outer rollers of its respective set contact so that outward movement of said rollers serves to move said driving member away from said disk.

Signed by me, this 20 day of July, 1926.

HANS HONIGMANN.